United States Patent
Shareef et al.

(10) Patent No.: US 7,881,886 B1
(45) Date of Patent: Feb. 1, 2011

(54) METHODS FOR PERFORMING TRANSIENT FLOW PREDICTION AND VERIFICATION USING DISCHARGE COEFFICIENTS

(75) Inventors: Iqbal A. Shareef, Fremont, CA (US); James V. Tietz, Fremont, CA (US); Vernon Wong, Mountain View, CA (US); Richard J. Meinecke, Fremont, CA (US)

(73) Assignee: Lam Research Corporation, Fremont, CA (US)

( * ) Notice: Subject to any disclaimer, the term of this patent is extended or adjusted under 35 U.S.C. 154(b) by 488 days.

(21) Appl. No.: 11/938,168

(22) Filed: Nov. 9, 2007

Related U.S. Application Data

(60) Provisional application No. 60/866,404, filed on Nov. 17, 2006.

(51) Int. Cl.
*G01F 25/00* (2006.01)

(52) U.S. Cl. .................. 702/47; 702/100; 702/104; 73/37; 73/861.52; 73/1.25; 137/10; 137/12; 137/14; 137/486; 137/487.5

(58) Field of Classification Search .................. 702/33, 702/45, 47, 50, 98, 100, 104, 105, 138; 73/53.04, 73/1.57, 1.35, 1.25, 220; 137/10, 12, 14, 137/487, 486, 487.5
See application file for complete search history.

(56) References Cited

U.S. PATENT DOCUMENTS

| | | | | |
|---|---|---|---|---|
| 4,437,489 | A | * | 3/1984 | Casale ............... 137/487.5 |
| 4,794,947 | A | * | 1/1989 | Kuramochi ............ 137/486 |
| 5,207,089 | A | * | 5/1993 | Abt et al. ............... 73/37 |
| 5,445,035 | A | | 8/1995 | Delajoud |
| 5,968,588 | A | | 10/1999 | Sivaramakrishnan et al. |
| 6,062,256 | A | * | 5/2000 | Miller et al. ........... 137/487.5 |
| 6,074,691 | A | | 6/2000 | Schmitt et al. |
| 6,523,346 | B1 | | 2/2003 | Hoffmann et al. |
| 6,591,850 | B2 | | 7/2003 | Rocha-Alvarez et al. |
| 6,619,139 | B2 | * | 9/2003 | Popp ................... 73/861.52 |
| 7,169,231 | B2 | | 1/2007 | Larson et al. |
| 7,335,396 | B2 | * | 2/2008 | Carpenter et al. ........ 427/248.1 |

(Continued)

FOREIGN PATENT DOCUMENTS

CN 1574200 2/2005

(Continued)

OTHER PUBLICATIONS

U.S. Appl. No. 11/938,171, filed Nov. 9, 2007; Inventors: Shareef et al.

(Continued)

*Primary Examiner*—Carol S Tsai
(74) *Attorney, Agent, or Firm*—IP Strategy Group, P.C.

(57) ABSTRACT

A method for determining an actual gas flow rate as gas flows through a gas flow delivery system is provided. The method includes sending the gas through the gas flow delivery system into a gas conduit, wherein a section of the gas conduit is widened to form an orifice. The method also includes pressurizing the gas to create a choked flow condition within the orifice of the gas conduit. The method further includes measuring upstream pressure of the gas via a set of pressure sensors. The method yet also includes calculating the actual flow rate based on the upstream pressure of the orifice of the gas conduit.

9 Claims, 4 Drawing Sheets

U.S. PATENT DOCUMENTS

| | | | |
|---|---|---|---|
| 7,376,520 | B2 | 5/2008 | Wong et al. |
| 2004/0056368 | A1 | 3/2004 | Hirahara et al. |
| 2004/0173091 | A1 | 9/2004 | Belke et al. |
| 2007/0021935 | A1* | 1/2007 | Larson et al. ............... 702/100 |
| 2008/0115560 | A1* | 5/2008 | Shareef et al. ............... 73/1.25 |

FOREIGN PATENT DOCUMENTS

| | | |
|---|---|---|
| KR | 1020010090666 A | 10/2001 |
| WO | WO-00/15870 A1 | 3/2000 |
| WO | WO-2007/008509 A2 | 1/2007 |

OTHER PUBLICATIONS

U.S. Appl. No. 11/083,761, filed Mar. 16, 2005; Inventors: Wong et al.

"First Office Action", China Application No. 200780042782.33, Mailing Date: Apr. 30, 2010.

"Written Opinion", Issued in PCT Application No. PCT/US2007/084724, Mailing Date: Apr. 21, 2008.

"International Search Report", Issued in PCT Application No. PCT/US2007/084724, Mailing Date: Apr. 21, 2008.

"International Preliminary Report on Patentability", Issued in PCT Application No. PCT/US2007/084724, Mailing Date: May 28, 2009.

"Non Final Office Action", U.S. Appl. No. 11/938,171, Mailing Date: Oct. 7, 2009.

"Australian Patent Office Examination Report", Issued in Singapore Application No. SG 200903325-9, Mailing Date: Jan. 21, 2010.

"Non Final Office Action", U.S. Appl. No. 11/398,171, Mailing Date: Mar. 29, 2010.

* cited by examiner

US 7,881,886 B1

METHODS FOR PERFORMING TRANSIENT FLOW PREDICTION AND VERIFICATION USING DISCHARGE COEFFICIENTS

PRIORTY CLAIM

This application is related to and claims priority under 35 U.S.C. §119(e) to a commonly assigned provisional patent application entitled "Methods For Performing Transient Flow Prediction and Verification Using Discharge Coefficient," by Shareef et al., application Ser. No. 60/866,404 filed on Nov. 17, 2006, all of which is incorporated herein by reference.

CROSS REFERENCE TO RELATED APPLICATIONS

The present invention is related to the following applications, all of which are incorporated herein by reference:

Commonly assigned application entitled "Methods For Performing Actual Flow Verification," by Shareef et al., application Ser. No. 60/866,406 filed on Nov. 17, 2006, all of which are incorporated herein by reference;

Commonly assigned application entitled "Gas Distribution System with Tuning Gas," filed on Dec. 31, 2002 by Larson et al., application Ser. No. 10/318,612; and Commonly assigned application entitled "System and Method for Gas Flow Verification," filed on Mar. 16, 2005 by Wong et al., application Ser. No. 11/083,761.

BACKGROUND OF THE INVENTION

Advances in plasma processing have facilitated growth in the semiconductor industry. During plasma processing, a semiconductor manufacturer may employ a recipe to etch and/or deposit material on a substrate. The recipe may include a plurality of parameters including, for example, the level of RF power, the gas, the temperature, the pressure, the gas flow rate, and the likes. Each of the parameters of the recipe works together to produce a quality device (e.g., MEMs, etc.). Thus, inaccurate parameters may result in substandard device and/or defective device.

To minimize inaccuracy, the various components that provide the parameters may have to be monitored and/or verified. The flow rate of gas is one such parameter that may have to be verified. During substrate processing, the amount of process gas furnished to the reaction chamber is generally carefully controlled. The indicated gas flow rate (i.e., process gas flow rate) is commonly controlled by a mass flow controller (MFC). Consider the situation wherein, for example a critical process step requires a flow rate of 40 standard cubic centimeters (sccm). A process engineer may enter the flow rate in the process recipe and apply the recipe into the plasma tool from a user interface. In entering the recipe flow rate, the process engineer is assuming that the mass flow controller (MFC) will be flowing gas into the reaction chamber at the desired rate. However, the actual flow rate of the gas may vary from the indicated flow rate of the MFC. As discussed herein, an indicated flow rate refers to the flow rate that is shown as the MFC flow rate that is displayed on the plasma tool's user interface.

The accuracy of the indicated flow rate may be dependent upon the accuracy of the MFC. During the manufacture of the MFC, one or more verification test may be performed on the MFC to validate that the gas flow rate control provided by the MFC is within established MFC design specification tolerances. The MFC verification is usually performed in a controlled laboratory environment using an inert gas, such as $N_2$ gas. To translate the verification results into corresponding results for other gases (which may be employed in actual production environment), conversion factors may be applied. However, the translated corresponding results may have errors since the conversion factors have an inherent level of uncertainty.

Over time, the MFC performance may degrade resulting in a flow rate inaccuracy. In other words, the indicated flow rate of the MFC may be outside of the design specification tolerance for the MFC due to calibration drift, zero drill, or gas-calibration error and the MFC may have to be recalibrated or replaced.

A flow verification method is required to determine the percentage of error of the MFC flow rate so that a flow correction can be made to correct the inaccuracy in the gas delivery system. One method that has been employed to validate the indicated flow rate of the MFC is the rate of rise (ROR) procedure. With the ROR procedure, a reaction chamber volume is filled and the pressure rate of use of the gas is measured. With the ROR method, an actual flow rate for the gas may be determined.

The ROR procedure is a lengthy process which may take about 10 or more hours. The long length time period may be due to the large reaction chamber volume (e.g., up to 60 liters. Other factors include a plurality of gas lines and a plurality of gas boxes in the plasma tool and elevated operating temperatures of certain reaction chambers In addition to the ROR procedure being a lengthy process, the ROR procedure may also suffered from inaccuracy in matching process results from chamber to chamber. In an example, the volume may vary between chambers of the same size due to manufacturing tolerance of chamber components. In an example, large temperature difference in the chamber may result in a change in volume. Thus, the ROR procedure is a cumbersome method that may introduce longer time duration due to elevated reaction chamber operation temperature.

Also, the ROR procedure may require the plasma tool to be cooled down before the ROR procedure may be performed. The cooling down period may be about 2 or more hours, which represents additional time the reaction chamber is not available for processing wafers. As a result, the ROR procedure may contribute to cost of ownership without really providing a true method for validating the indicated flow rate of the MFC.

Another method that may be employed to verify the indicated flow rate of the MFC includes utilizing a small external ROR chamber or a flow measurement standard (e.g., Molbloc) instead of the actual reaction chamber. With the external flow measurement device method, the external device may be employed as a testing device which may be directly connected to the MFC to test the flow rate of a gas. Thus, the external device may be employed as a flow verification device.

By employing the external device, a plurality of pressure sensing manometers may be required to accurately measure pressure measurements covering the flow rate of semiconductor manufacturing equipment from 1 sccm to 10,000 sccm. To minimize the time duration of each pressure measurement, a plurality of chamber volumes may have to be designed into the small chamber ROR device. In addition, by employing the smaller chamber ROR device, the time period for filling up the chamber is reduced and the temperature impact on the chamber may also be minimized. However, only inert gases may be tested in the smaller chamber. Thus, real gases that may be employed in etching (e.g., etchant gases) are not tested. As a result, the eternal flow measurement device method is unable to test for the effect on flow rate due to the compressibility of the gases. In addition, the smaller chamber ROR device usually requires the utilization of a separate proprietary computer system, thereby not providing an integrated solution with the plasma processing system.

BRIEF DESCRIPTION OF THE DRAWINGS

The present invention is illustrated by way of example, and not by way of limitation, in the figures of the accompanying drawings and in which like reference numerals refer to similar elements and in which.

BRIEF SUMMARY OF THE INVENTION

Figure 1:
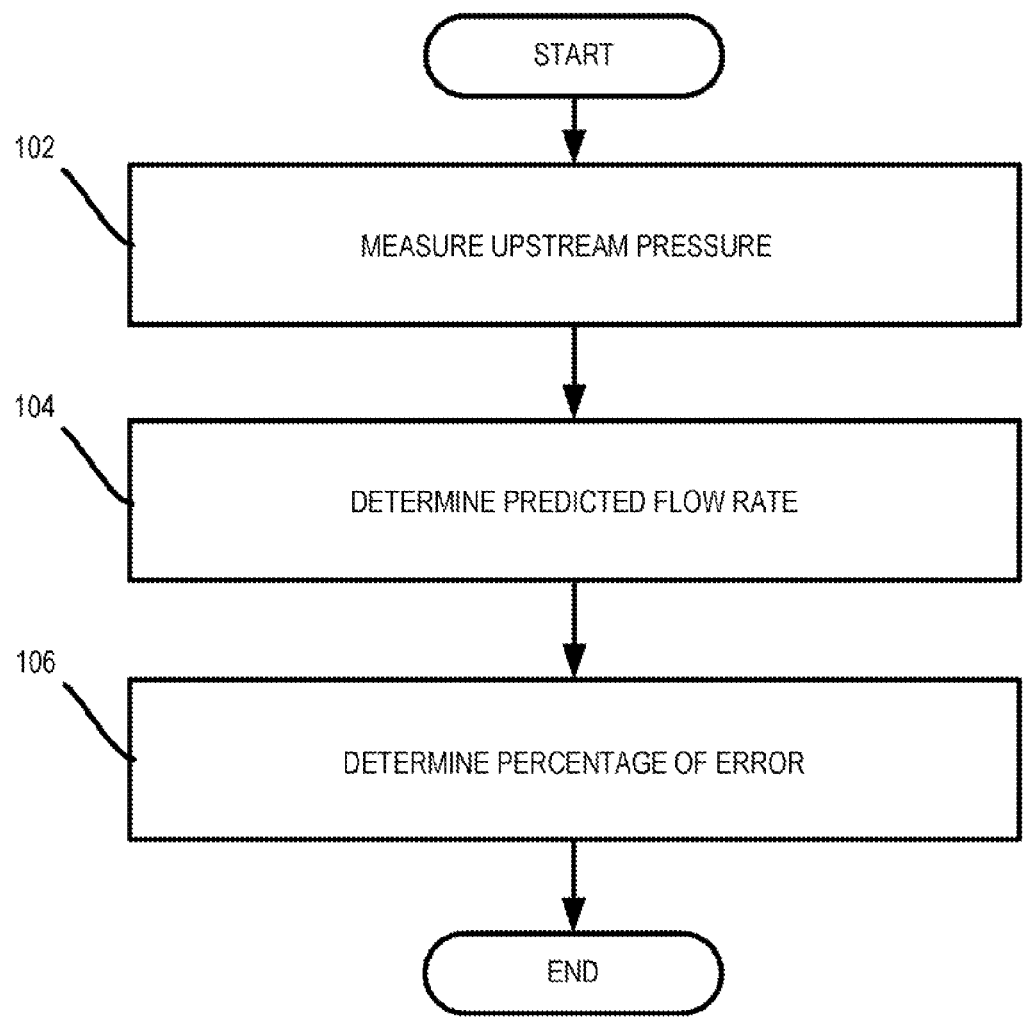
FIG. 1 shows, in an embodiment of the invention, a simple flow chart illustrating the steps for determining a percentage of error for correcting an MFC.

The invention relates, in an embodiment, to a method for determining an actual gas flow rate as gas flows through a gas flow delivery system. The method includes sending the gas through the gas flow delivery system into a gas conduit, wherein a section of the gas conduit is widened to form an orifice. The method also includes pressurizing the gas to create a choked flow condition within the orifice of the gas conduit. The method further includes measuring upstream pressure of the gas via a set of pressure sensors. The method yet also includes calculating the actual flow rate based on the upstream pressure of the orifice of the gas conduit.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

DETAILED DESCRIPTION OF VARIOUS EMBODIMENTS

The present invention will now be described in detail with reference to various embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

In accordance with one aspect of the present invention, the inventors herein realized that when an orifice is in a choked flow condition, in which the gas is flowing at sonic velocity, the actual flow rate of the gas may be determined from the upstream pressure (i.e., the pressure at the input channel of the orifice). Thus, the inventors herein realized that a more accurate and less time consuming process may be implemented by determining actual flow rate, which in turn enable the calculation of percentage of error, in an orifice instead of measuring flow rate in a process chamber (e.g., ROR procedure) and/or a small testing chamber (e.g., MoBlock and DryCal).

In accordance with embodiments of the present invention, a discharge coefficient method is provided for validating an actual flow rate of a gas delivered by a gas delivery system having a mass flow controller. In an embodiment, the discharge coefficient method includes calculating the percentage of error based on measuring an upstream pressure within an orifice in a choked flow condition. As discussed herein, a choked flow condition refers to the condition in which pressure of a gas is at sonic velocity. In an embodiment, during a choked flow condition, the flow rate may correspond to the upstream pressure of an orifice.

In an embodiment, a predicted flow rate (i.e., actual flow rate) may be empirically calculated. The predicted flow rate, in an embodiment, is dependent upon the discharge coefficient of a given gas and a given orifice. In an embodiment, the discharge coefficient may be determined and calculated given known parameters such as the volume of a gas, the temperature of a gas, the gamma factor or heat capacity for a gas, the cross-sectional area of an orifice, and the orifice time constant ($\tau$).

In an embodiment, the orifice time constant ($\tau$) may be determined by plotting a set of data points, which represent pressure decaying over time as gas is being emptied from a manifold (e.g., a tank or holding area) through an orifice into a vacuum environment. Consider the situation wherein, for example, a gas is flowing through an inlet valve into a manifold from which the gas then flows through an orifice into a vacuum environment. The gas, being delivered is pressurized in order to create a choked flow condition. Once the choked flow condition is reached, the inlet valve may be shut off, thereby preventing additional gas from flowing into the manifold.

To determine the orifice time constant ($\tau$), a set of data points representing pressure decaying over time may be measured and collected using a pressure sensor (e.g., manometer). In other words, pressure is observed and measured in the transient pressure decaying environment to determine how much and how quickly pressure is declining as gas is being emptied out of the manifold. In an embodiment, no additional data point is collected once the choked flow condition is invalid.

Once sufficient data points have been collected, the set of data points may be plotted. By applying an exponential decay curve to the set of data points, the orifice time constant ($\tau$) may be determined, in an embodiment. As discussed herein, the orifice time constant refers to the time constant that characterizes the rate of decay for an orifice. In other words, the orifice time constant (τ) may determine how quickly an orifice may be allowing the gas to flow out of the manifold.

Once the orifice time constant (τ) has been calculated, the discharge coefficient may be calculated. Besides the orifice time constant (τ), the discharge coefficient may also be dependent upon other variables such as the volume of the manifold, the temperature of the gas, the gamma factor of the gas, and the molecular weight of the gas. In an embodiment, the calculation of the discharge coefficient provides a method for characterizing an orifice.

In an embodiment, once the discharge coefficient has been determined for each gas given a specific orifice, the discharge coefficient does not have to be recalculated. In addition, the discharge coefficient for each gas may be pre-calculated, in an embodiment, and be integrated into the percentage of error calculation for the plasma tool.

In an embodiment, the percent of error may be calculated by dividing the indicated flow rate of the MFC into the difference between the predicted flow rate and the indicated flow rate. With the percentage of error, the process engineer may now be able to either adjust the indicated flow rate to correct for the error or to request for a new MFC.

The features and advantages of the invention may be better understood with reference to the figures and discussions that follow.

FIG. 1 shows, in an embodiment of the invention, a simple flow chart illustrating the steps for determining a percentage of error for correcting an MFC.

At a first step 102, the upstream pressure is measured by a pressure sensor (e.g., manometer).

Consider the situation, wherein for example, a gas is delivered by a gas delivery system having a mass flow controller (MFC) into an orifice at an indicated flow rate of 40 sccm. The gas may be pressurized to enable the flow rate to attain sonic velocity, which may result in a choked flow condition. In a choked flow condition, the flow rate of the gas is independent of downstream pressure through the orifice; thus, the flow rate at the input end of the orifice may correlate with the upstream pressure of the orifice. By placing a pressure sensor upstream of the orifice while the orifice is in a choked flow condition, the pressure of the gas may be measured.

At a next step 104, the predicted flow rate may be determined from the upstream pressure of the orifice. In an embodiment, the predicted flow rate for a specific gas may be empirically calculated based on Equation 1 (i.e., steady state equation for flow rate) listed below.

$$Q_{in}=P_{ss}C_d K_g K \quad \text{[Equation 1]}$$

$Q_{in}$=predicted flow rate $P_{ss}$=steady state pressure or upstream pressure $C_d$=discharge coefficient $K_g$=gas properties factor K=cross-sectional area of the orifice As mentioned above, $P_{ss}$ may be measured by a pressure sensor at step 102.

The discharge coefficient, $C_d$, is a ratio of an actual flow rate through an orifice to a theoretical flow rate. The calculation of the discharge coefficient may be discussed in later figures.

The as properties factor, $K_g$, may be specific to the gas that is being measured. The gas properties factor may take into consideration the gamma factor (e.g., heat capacity) of the gas, the temperature of the gas, and the molecular weight of the gas (See Gas Properties Factor section for the formula).

The gamma factor and the molecular weight of the gas may be extracted from one or more standard tables. The temperature of the gas may be measured.

The cross-sectional area of the orifice, K, may be measured for a given orifice.

At a next step 106, the percentage of error that may be employed to correct the MFC may be determined. In calculating the percentage of error, the indicated now rate of the MFC is divided into the difference between the predicted flow rate and the indicated flow rate of the MFC (See Equation 2 below).

$$\text{Percentage of Error}=(PFR-IFR)/IFR \quad \text{[Equation 2]}$$

PFR=predicted flow rate

IFR=indicated flow rate of the MFC

In an example, the predicted flow rate is 39 sccm and the indicated flow rate of the MFC is 40 sccm. Thus, the difference is 1 sccm and the percentage of error is 0.025 percent. With the percentage of error, the indicated flow rate of the MFC may be adjusted accordingly thus enabling a more accurate flow rate to be entered.

Figure 2:
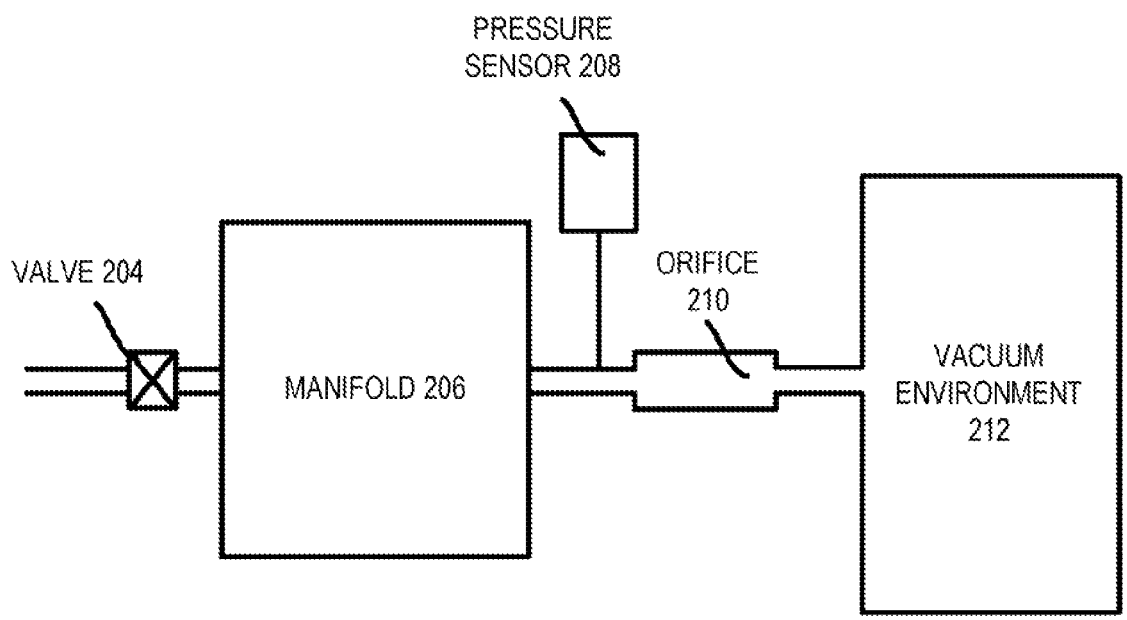
FIG. 2 shows, in an embodiment of the invention, an architectural arrangement of a transient decay environment.
Figure 3:
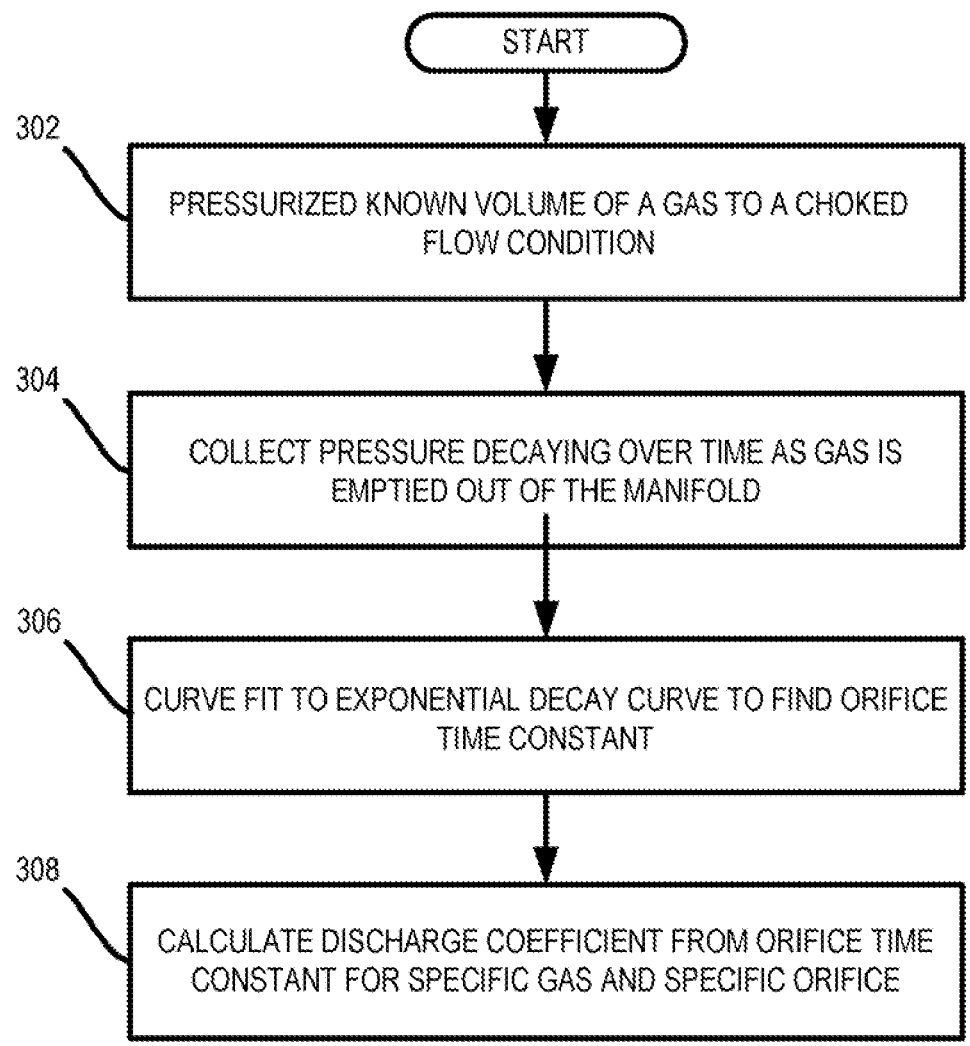
FIG. 3 shows, in an embodiment of the invention, a flow chart for describing the method for finding a discharge coefficient.
Figure 4:
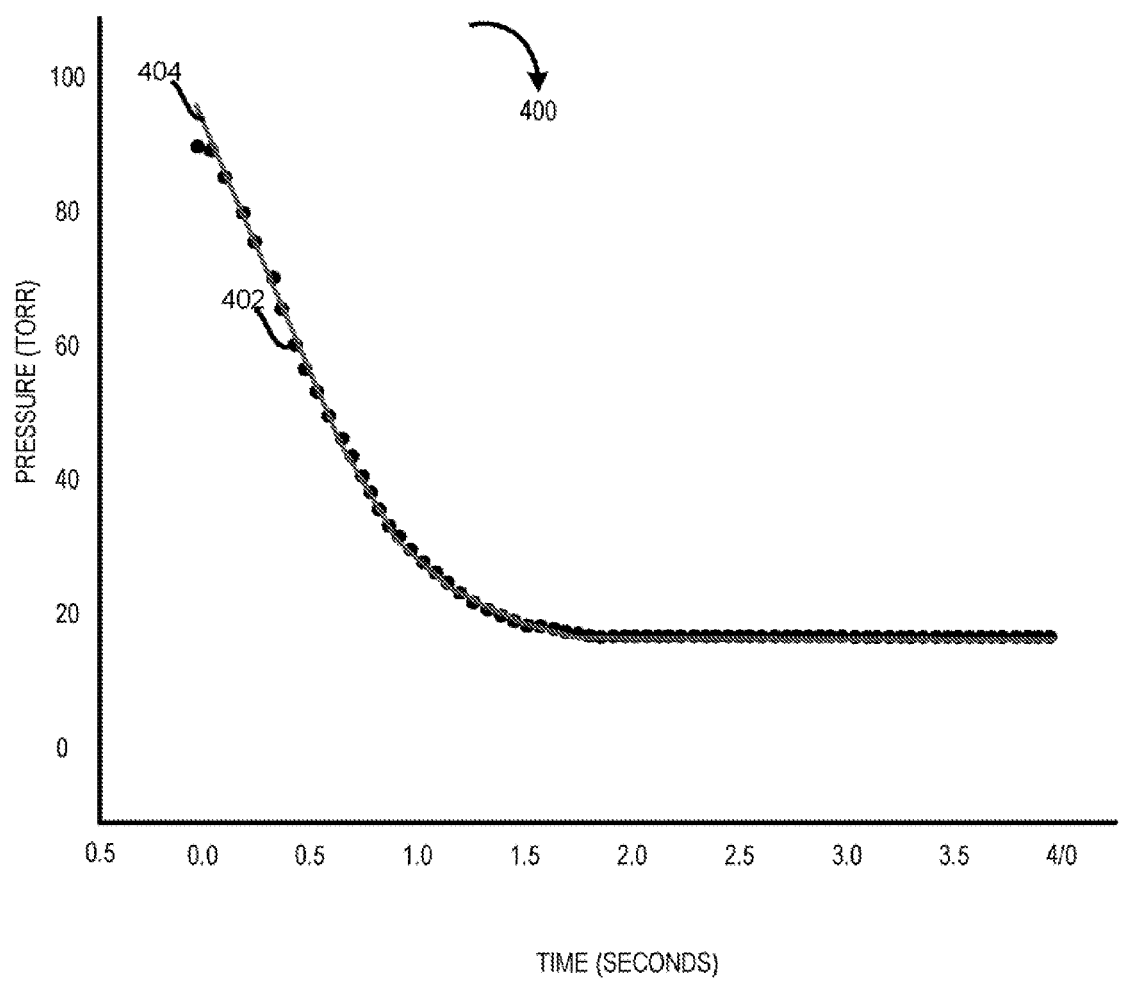
FIG. 4 shows, in an embodiment of the invention, a pressure value vs. time graph.

As mentioned above, a discharge coefficient is a ratio of an actual flow rate of a gas through an orifice to a theoretical flow rate of the same gas. FIGS. 2-4 will be employed to discuss how the discharge coefficient of a specific gas and an orifice of a specific size may be calculated.

In one aspect of the invention, the inventors herein realized that the discharge coefficient may characterize an orifice in a transient decay environment. FIG. 2 shows, in an embodiment, an architectural arrangement of a transient decay environment. As discussed herein a transient decay environment refers to an environment in which the pressure of the gas is slowly decaying (e.g., reducing).

A discharge coefficient may be calculated from an orifice time constant (τ). To calculate the orifice time constant (τ), the inventors herein realized that a set of measured data points of pressure values vs. time may be plotted and regression fit (such as exponential decay curve fitting) may be performed on the set of data points to determine the orifice time constant (τ).

Consider the situation wherein, for example, a gas is being delivered from a gas delivery system having a mass flow controller (MFC). The gas is flowing through a valve 204, into a manifold 206, through an orifice 210, and into a vacuum environment 212. In an embodiment, manifold 206 may be a tank or holding area for the gas.

In an embodiment, orifice 210 may be formed by a gas conduit connecting manifold 206 to vacuum environment 212. The gas conduit may include a cavity for allowing the gas to flow through. In an embodiment, a section of the cavity may be enlarged to form orifice 210.

In an embodiment, vacuum environment 212 may be a vacuum pump, a vacuum chamber, and the like. In an embodiment, vacuum environment 212 is independent of a plasma tool processing chamber. By being independent of the processing chamber, verification may be performed in parallel with processing, in an embodiment. In other words, verification may be performed without increasing the cost of tool ownership.

In an embodiment, the gas is being delivered from the MFC at a high pressure in order to achieve sonic velocity or choked flow condition. Once the choked flow condition has been achieved, valve 204 is turn off so that no additional gas may flow into the transient decay environment.

Even though no additional gas may be delivered into the transient decay environment, the choked flow condition may be maintained for a significant time period enabling a pressure sensor 208, attached upstream from orifice 210 and downstream from manifold 206, to measure a set of data points, which is a set of pressure values vs. time. The set of data points may represent pressure decaying over time as gas flows out of manifold 206. The choked flow condition may be maintained because manifold 206 is significantly larger than orifice 210.

In an embodiment, the set of data points measured may be plotted onto a curve and may be regression fitted by employing an exponential decay curve-fitting equation to the set of data points to determine an orifice time constant. Once the orifice time constant has been determined, the discharge coefficient may be empirically calculated for the specific gas.

FIG. 3 shows, in an embodiment, a flow chart for describing the method for finding a discharge coefficient for a specific gas and a given orifice. FIG. 3 will be discussed in relation to FIG. 2.

At a first step 302 the known volume of a gas is pressurized so that a choked flow condition may be established. Note that the volume for manifold 206, which is located upstream of the orifice, is a known volume. The gas is delivered by the MFC into manifold 206 at a pressure that is sufficient to reach sonic velocity. Once sonic velocity has been attained (i.e., the gas is now in a choked flow condition), inlet valve 204 may be turned off, thereby, preventing additional gas from flowing into manifold 206.

At a next step 304, the pressure value vs. time values is collected. In other words, pressure sensor 208, which is attached upstream from orifice 210 and downstream from manifold 206, may begin measuring the transient pressure that is slowly decaying/reducing.

At a next step 306 the set of data points is plotted and is curve-fitted to an exponential decay curve in order to determine the orifice time constant ($\tau$).

FIG. 4 shows, in an embodiment of the invention, a pressure value vs. time graph 400. The set of data points 402 may be plotted to create graph 400. As can be seen from graph 400, pressure decaying over time is recorded as the gas empties out of manifold 206 into orifice 210. In an embodiment, a curve 404 may represent a curve-fitting line after a set of data points 402 has been regression fitted. In an embodiment, an exponential decay curve (e.g. Origin) may be applied to set of data points 402 to perform the regression fit and to determine the orifice time constant ($\tau$). Regression fitting as a mathematical approach and various techniques therefor is known to those skilled in the art. No further discussion will be provided.

Referring back to FIG. 3, at a next step 308, a discharge coefficient may be calculated. Besides the orifice time constant ($\tau$), the discharge coefficient equation may also include the following variables: the temperature of the gas, the volume of the manifold, the gas properties factor, and the area of the orifice (See Equation 3).

$$C_d = ((1/\tau)/V_{cm}^3/T_k))/58827.5 A_{in}^2 (K_g) \quad [\text{Equation 3}]$$

$C_d$=discharge coefficient $\tau$=orifice time constant $K_g$=gas properties factor V=volume of the manifold $T_k$=temperature of the gas A=area of the orifice The discharge coefficient, $C_d$, is a ratio of an actual flow rate through an orifice to a theoretical flow rate.

As mentioned above, the orifice time constant, $\tau$, may be determined by applying an exponential decay curve to the set of pressure values measured during the choked flow condition.

As aforementioned in Equation 1, the gas properties factor, $K_g$, may be specific to the gas that is being measured. The gas properties factor may take into consideration the gamma factor (e.g., heat capacity) of the gas, the temperature of the gas, and the molecular weight of the gas (See Gas Properties Factor section for the formula). The gamma factor and the molecular weight of the as may be extracted from one or more standard tables. The temperature of the gas may be measured.

The volume of the manifold, V, is the volume upstream from the orifice and may be measured.

The temperature of the gas, $T_k$, is the temperature of the gas being measured. The temperature of the gas may be measured.

The area of the orifice, A, is the cross-sectional area of the orifice being tested.

As mentioned above, once the orifice has been characterized, the discharge coefficient may be employed to calculate a predicted flow rate. In an embodiment, the discharge coefficients for each gas for a given orifice may be pre-calculated for a plasma tool and be programmed into the plasma tool. Thus, the calculation of the percentage of error may be performed in-situ and without manual interference.

As can be appreciated from embodiments of the invention, a discharge coefficient method for validating an actual flow rate of a gas being delivered by a gas delivery system having an MFC may be performed by measuring upstream pressure within an orifice in a choked flow condition. The cost of validating the actual flow rate is substantially reduced since the cost associated with taking the processing tool offline is eliminated since the discharge coefficient method employs a vacuum environment (e.g., vacuum pump) that is independent of the processing chamber. Also, the discharge coefficient method may be incorporated into the plasma tool to provide a more integrated solution. Further, the discharge coefficient method is an in-situ method enabling validation to be performed without requiring manual intervention. In addition, the actual gas (e.g., inert gas, reactive gas, etc.) that is required in a recipe is employed instead of basing the percentage of error only on inert gases. As a result, the discharge coefficient method is a more effective and efficient method of validating actual flow rate without significantly adding to the cost of ownership.

Gas Properties Factor $$K_g = (2/\gamma+1)^{(\gamma+1)/(2\gamma-2)} \sqrt{\gamma/TM} \quad [\text{Equation 4}]$$

As aforementioned, one of the factor determining the predicted flow rate ($Q_{in}$) of Equation 1 is the gas properties factor ($K_g$). The gas properties factor ($K_g$) is usually specific to the gas being measured and may take into consideration the gamma factor ($\gamma$) of the gas, the temperature of the gas (T), and the molecular weight of the gas (M). See Equation 4 above.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An arrangement for determining actual gas flow rate being delivered by a gas flow delivery system, said arrangement comprising:

a valve, said valve being associated with a mass flow controller (MFC), said valve being configured for controlling the flow of gas through said gas flow delivery system;

a manifold, said manifold being a storage tank for said gas, said manifold being positioned downstream from said valve;

a gas conduit for delivery said gas from said manifold, a section of said gas conduit is wide to form an orifice, said orifice being positioned downstream from said manifold, said orifice having an area size smaller than said manifold;

a set of pressure sensors, said set of pressure sensors being positioned upstream from said orifice and downstream from said manifold; and a storage container, said storage container forming a vacuum environment for receiving said gas, said storage container being positioned downstream from said orifice, said storage container being independent of a processing chamber of a plasma processing system, wherein said gas flows through said valve and said manifold at a pressure to create a choked flow condition in said orifice of said gas conduit as said gas is flowing through said gas conduit into said storage container.

2. The arrangement of claim 1 wherein said storage container includes a pump.

3. The arrangement of claim 2 wherein said valve is set to an off position when said choked flow condition in said orifice of said gas conduit is attained.

4. The arrangement of claim 3 wherein said set of pressure sensors is configured for measuring a set of pressure data points at a set of time periods.

5. The arrangement of claim 4 said set of pressure data points represents pressure decaying over time as said gas flows out of said manifold into said orifice of said gas conduit.

6. The arrangement of claim 5 wherein an exponential decay curve-fitting equation is applied to said set of pressure data points at said set of time periods to determine an orifice time constant.

7. The arrangement of claim 6 wherein said actual flow rate is also based on a discharge coefficient, a gas properties factor, and a cross-sectional area of said orifice.

8. The arrangement of claim 7 wherein said discharge coefficient is at least a factor of said orifice time constant, volume of said manifold, temperature of said gas, said gas properties factor, and area of said manifold.

9. The arrangement of claim 7 wherein said actual flow rate is employed to determine a percentage of error for said MFC by dividing an indicated flow rate into a difference between said actual flow rate and said indicated flow rate, said indicated flow rate being a flow rate as indicated by said MFC.

* * * * *